United States Patent
Ragaini et al.

(10) Patent No.: US 9,787,095 B2
(45) Date of Patent: Oct. 10, 2017

(54) METHOD FOR MANAGING THE LOAD PROFILE OF A LOW OR MEDIUM VOLTAGE ELECTRIC NETWORK AND A CONTROL SYSTEM THEREOF

(75) Inventors: Enrico Ragaini, Bergamo (IT); Antonio Fidigatti, Spino d'Adda (IT); Federico Silvestro, Genoa (IT); Andrea Morini, Genoa (IT); Alessandro De Danieli, Alessandro (IT)

(73) Assignee: ABB S.p.A., Milan (IT)

( * ) Notice: Subject to any disclaimer, the term of this patent is extended or adjusted under 35 U.S.C. 154(b) by 446 days.

(21) Appl. No.: 14/384,309

(22) PCT Filed: Mar. 15, 2012

(86) PCT No.: PCT/EP2012/054591
§ 371 (c)(1),
(2), (4) Date: Sep. 10, 2014

(87) PCT Pub. No.: WO2013/135296
PCT Pub. Date: Sep. 19, 2013

(65) Prior Publication Data
US 2015/0028671 A1  Jan. 29, 2015

(51) Int. Cl.
*H02J 3/14* (2006.01)

(52) U.S. Cl.
CPC ............ *H02J 3/14* (2013.01); *Y02B 70/3225* (2013.01); *Y04S 20/222* (2013.01); *Y10T 307/391* (2015.04)

(58) Field of Classification Search
CPC ............ Y10T 307/391; Y02B 70/3225; Y04S 20/222; H02J 3/14
USPC .......................................................... 307/29
See application file for complete search history.

(56) References Cited

U.S. PATENT DOCUMENTS

| | | | |
|---|---|---|---|
| 4,464,724 A | 8/1984 | Gurr et al. | |
| 4,620,283 A | 10/1986 | Butt et al. | |
| 5,414,640 A | 5/1995 | Seem | |
| 5,778,675 A | 7/1998 | Nakhamkin | |
| 8,598,737 B2 * | 12/2013 | Foxall | H02J 7/0068 307/17 |

FOREIGN PATENT DOCUMENTS

| | | |
|---|---|---|
| KZ | 22449 A4 | 4/2010 |
| RU | 113886 U1 | 2/2012 |

OTHER PUBLICATIONS

First Office Action issued on Feb. 15, 2016 in Russian Appln No. 2014141500.

* cited by examiner

*Primary Examiner* — Hal Kaplan
(74) *Attorney, Agent, or Firm* — Polsinelli PC

(57) ABSTRACT

The invention relates to a method for managing the load profile of a low or medium voltage electric network that is supplied by at least an electric power source.
The electric network comprises one or more electric loads and one or more controllable switching devices for disconnecting/connecting said electric loads from/with said electric power source.
The method comprises the step of measuring a time window from a reference instant, the step of determining at least a check instant comprised in said time window and the step of executing a load profile control procedure at said check instant.
In a further aspect, the invention relates to a control system for executing the above described method.

21 Claims, 11 Drawing Sheets

| DATA SET | |
|---|---|
| $D_1$ | Data indicative of the rank assigned to each electric load |
| $D_2$ | Data indicative of the disconnection level assigned to the electric network |
| $D_3$ | Data indicative of the maximum and minimum level of absorbed electric energy |
| $D_5$ | Data indicative of the availability of the electric loads to be connected/disconnected |
| $D_6$ | Data indicative of the rank assigned to each electric generator |
| $D_7$ | Data indicative of the availability of the electric generators to be connected/disconnected |

| DATA SET | |
|---|---|
| $D_4$ | Data indicative of the actually absorbed electric energy |

FIG. 11

METHOD FOR MANAGING THE LOAD PROFILE OF A LOW OR MEDIUM VOLTAGE ELECTRIC NETWORK AND A CONTROL SYSTEM THEREOF

CROSS REFERENCE TO RELATED APPLICATIONS

This application is a National Phase filing under 35 U.S.C. §371 of PCT/EP2012/054591 filed on Mar. 15, 2012; the entire contents of which are hereby incorporated by reference.

The present invention relates to a method, and a control system thereof, for managing the load profile of a low or medium voltage electric network, e.g. an electric power distribution network for industrial, commercial and residential buildings or plants.

As is known, large electric installations generally comprise a huge number of different loads, which mostly work independently one from the other.

Experience has shown how the missing coordination of the activation/deactivation of these electric loads may give rise to high peaks of electric power consumption, which may vary by time of day, day of week, week of month, and month of year.

As an example, in a residential building high power consumption peaks are often reached either in the hottest or coldest days of the year.

The uncontrolled rise of power consumption may lead to the malfunctioning of the electric network and/or the intervention of overload protection devices with possible relevant discomforts for the users.

Further, the increase of the power demand may give rise to the obligation of paying expensive penalty fees to the electric energy provider.

Currently available methods for actively managing the load profile of extended electric networks do not provide satisfactory performances.

Generally, the available solutions are based on the adoption of predefined load shedding schemes (e.g. rolling blackout schemes), which suffer of a number of disadvantages.

Mostly, such solutions use instantaneous power measurements as a basis for load disconnection, i.e., they disconnect the electric loads immediately when power consumption exceeds a fixed threshold. This may cause unnecessary disconnections of said loads in case of transients, e.g. motor starting.

In the market, it is thus still felt the demand for methods and control systems that are capable of providing an effective load management of extended low or medium voltage electric networks, relieving electric power demand peaks, avoiding undesired overload protection interventions and avoiding the obligation of paying burden penalty fees to the energy provider.

In order to respond to this need, the present invention provides a method for managing the load profile of a low or medium voltage electric network, according to the following claim 1 and the related dependent claims.

The method, according to the present invention, provides a coordinated management of the configuration of the electric network in order to control the load profile of this latter over predefined time windows.

In particular, the method, according to the present invention, allows to dynamically manage the disconnection/connection of the electric loads of an electric network in order to achieve an optimal power consumption target (or average power target) over a certain period of time.

The method, according to the invention, adopts load management criteria that can be easily tuned and adapted in accordance with the operating conditions of the electric network.

The method, according to the present invention, allows to take into account the possible capability of the electric network of generating electric power to feed some electric loads or be delivered to the electric power source that normally feeds the electric network, for example by means of alternative electric power generation means (solar generation plants, wind generation plants, and the like).

A further degree of freedom can thus be easily introduced in the management of the load profile of the electric network.

In a further aspect, the present invention relates to a control system for controlling the load profile of a low or medium voltage electric network, according to the following claim 12 and the related dependent claims.

The control system, according to the invention, may be easily implemented in practice according to various control architectures. This allows an easy installation on the field, even in already operating electric networks.

Further characteristics and advantages of the present invention shall emerge more clearly from the description of preferred but not exclusive embodiments of the method as in the invention, and the control system thereof, illustrated purely by way of example and without limitation in the attached drawings, in which:

FIG. 7-11 are diagrams that schematically illustrate some steps of the method, according to the invention.

With reference to the mentioned figures, in a first aspect, the present invention relates to a method for managing the load profile of a low or medium voltage electric network 10.

Within the framework of the present invention the term "low voltage" relates to voltages lower than 1 kV AC and 1.5 kV DC while the term "medium voltage" relates to voltages lower than 72 kV AC and 100 kV DC.

Further, the expression "load profile" identifies the variations over time of the amount of electric power that is absorbed by an electric network.

Preferably, the electric network 10 is an electric network for relatively large industrial, commercial and residential buildings or plants.

Preferably, the electric network 10 is characterised by an average power consumption comprised in the range between 0.5 MW and 1.5 MW.

Preferably, the electric network 10 is supplied by an electric power source 100, which may be the electric power production utility.

Alternative embodiments of the present invention (not shown) may foresee that the electric network 10 is supplied by a plurality of concurrent electric power sources.

The electric network 10 comprises at least an electric load, which can be disconnected/connected from/with said electric power source 100.

Within the framework of the present invention the term "electric load" relates to any device or group of devices that is capable of absorbing electric power from the electric power source 100.

Preferably, the electric network 10 comprises a plurality of electric loads $L_1, \ldots, L_K$ (where K is an integer higher than 1) that can be disconnected/connected from/with the electric power source 100.

As shown in FIGS. 1-5, the electric loads $L_1, \ldots, L_K$ may be arranged on different branches, according to a multi-level configuration.

Figure 2:
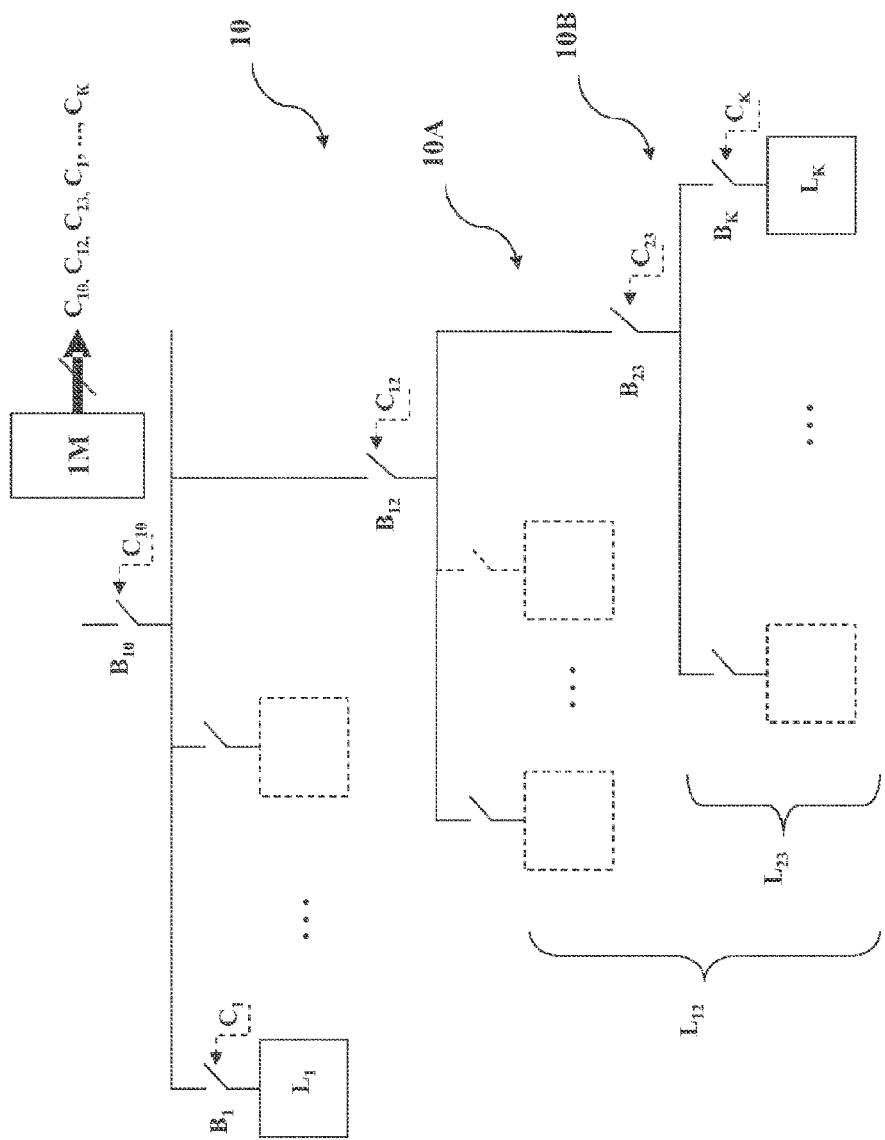

As shown in FIG. 2, one or more branches of the electric network 10 may form an electric load (see electric loads $L_{12}$, $L_{23}$).

Of course, also the whole electric network 10, seen from the output terminals of the electric power source 100, forms itself an electric load.

Figure 1:
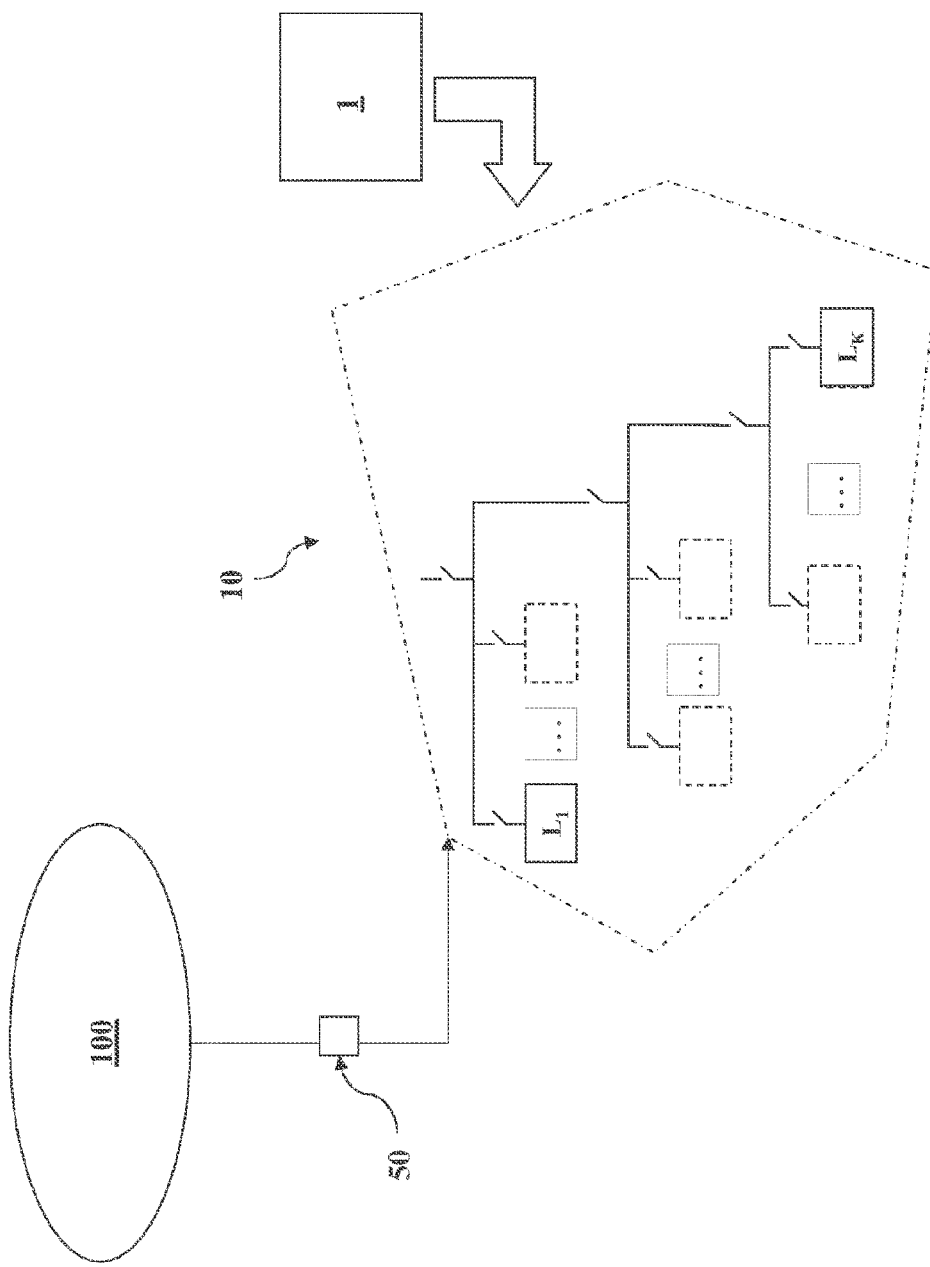
FIG. 1-6 are diagrams that schematically illustrate some control architectures of the control system, according to the invention.
Figure 3:
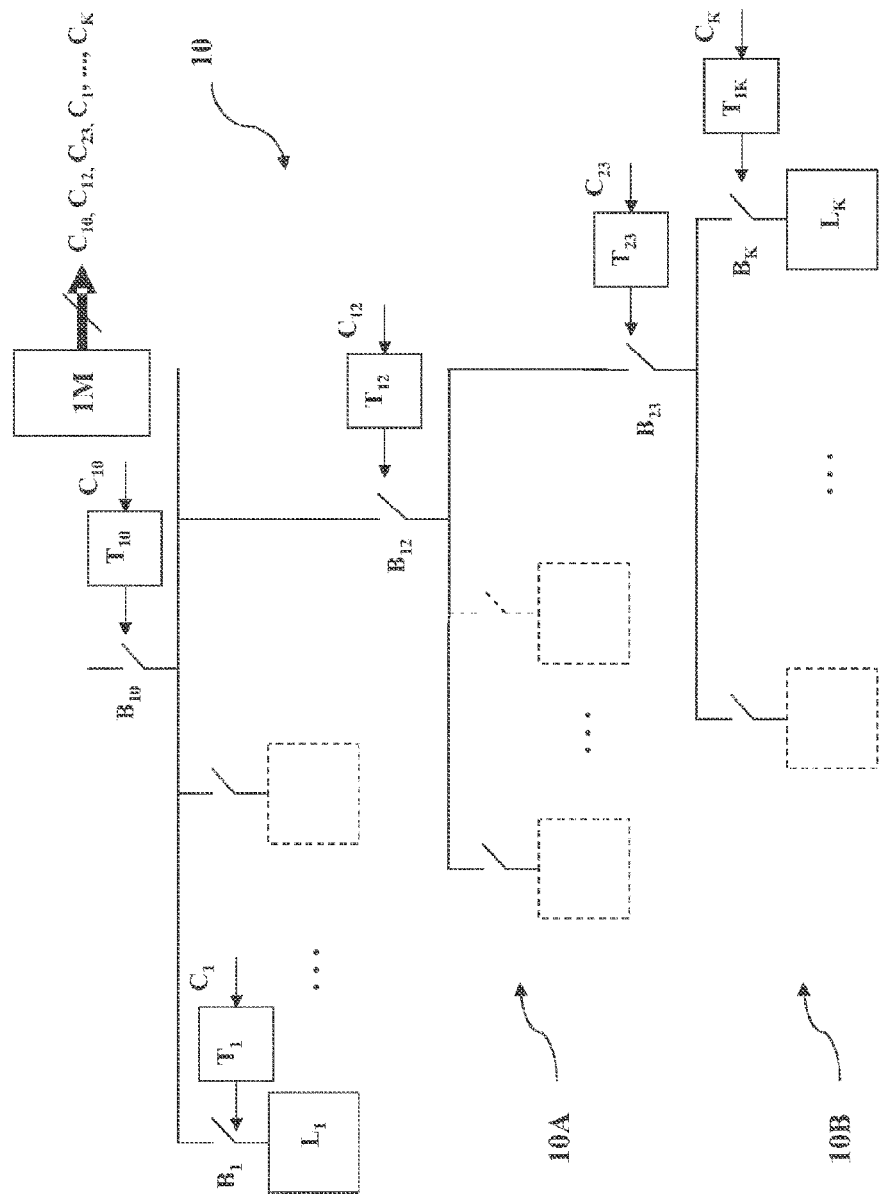
Figure 4:
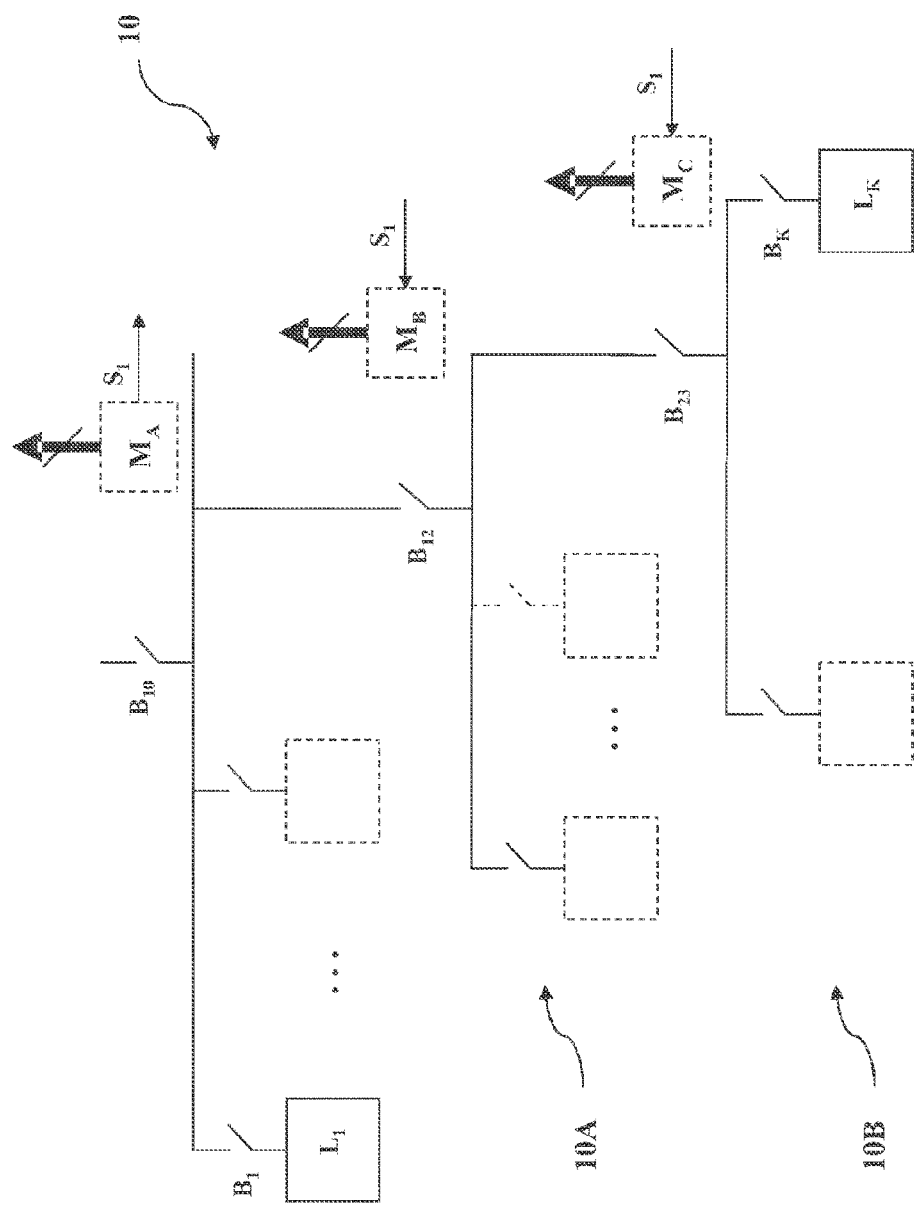
Figure 5:
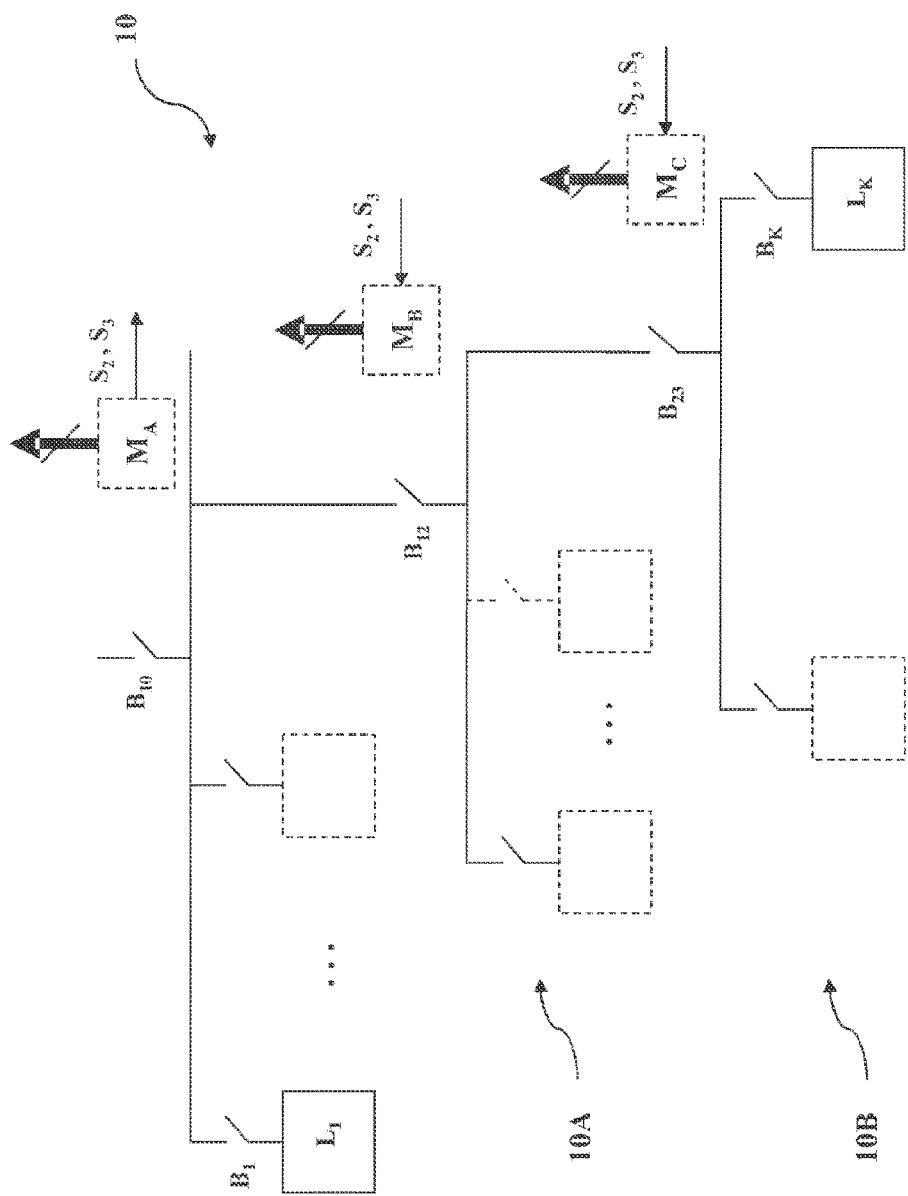

The electric loads $L_1, \ldots, L_K$ may be arranged according to configurations different from that one shown in FIGS. 1-3, according to the needs.

The electric network 10 comprises at least a controllable switching device for disconnecting/connecting said at least an electric load from/with said electric power source 100.

Within the framework of the present invention the term "switching device" relates to a circuit breaker, a disconnector, a contactor or another similar device.

Preferably, the electric network 10 comprises a plurality of controllable switching devices $B_{10}, B_{12}, B_{23}, B_1, \ldots, B_K$ for disconnecting/connecting the electric loads $L_1, \ldots, L_K$ from/with the electric power source 100.

As shown in FIGS. 1-5, each of the switching devices $B_1, \ldots, B_K$ is advantageously operatively associated with a corresponding electric load $L_1, \ldots, L_K$ for disconnecting/connecting this latter from/with from the electric power source 100.

The switching device $B_{12}$ is advantageously arranged for disconnecting/connecting the electric load $L_{12}$ formed by the branches 10A, 10B of the electric network 10 while the switching device $B_{23}$ is arranged for disconnecting/connecting the electric load $L_{23}$ formed by the sole branch 10B.

The main switching device $B_{10}$ is conveniently arranged for disconnecting/connecting the entire electric network 10 from/with the electric power source 100.

The switching devices $B_{10}, B_{12}, B_{23}, B_1, \ldots, B_K$ may be arranged according to configurations different from that one shown in FIGS. 1-3, according to the needs.

According to some embodiments of the present invention, the electric network may comprise one or more electric generators $G_1, \ldots, G_M$.

Within the framework of the present invention the term "electric generator" relates to any device or group of devices that is capable of providing electric power to some electric loads and/or the electric power source 100.

The electric generators $G_1, \ldots, G_M$ can be disconnected/connected from/with the electric power source 100.

To this aim, suitable switching devices may be operatively associated with the electric generators $G_1, \ldots, G_M$ (FIG. 6) for disconnecting/connecting these latter from/with the electric power source 100.

Figure 6:
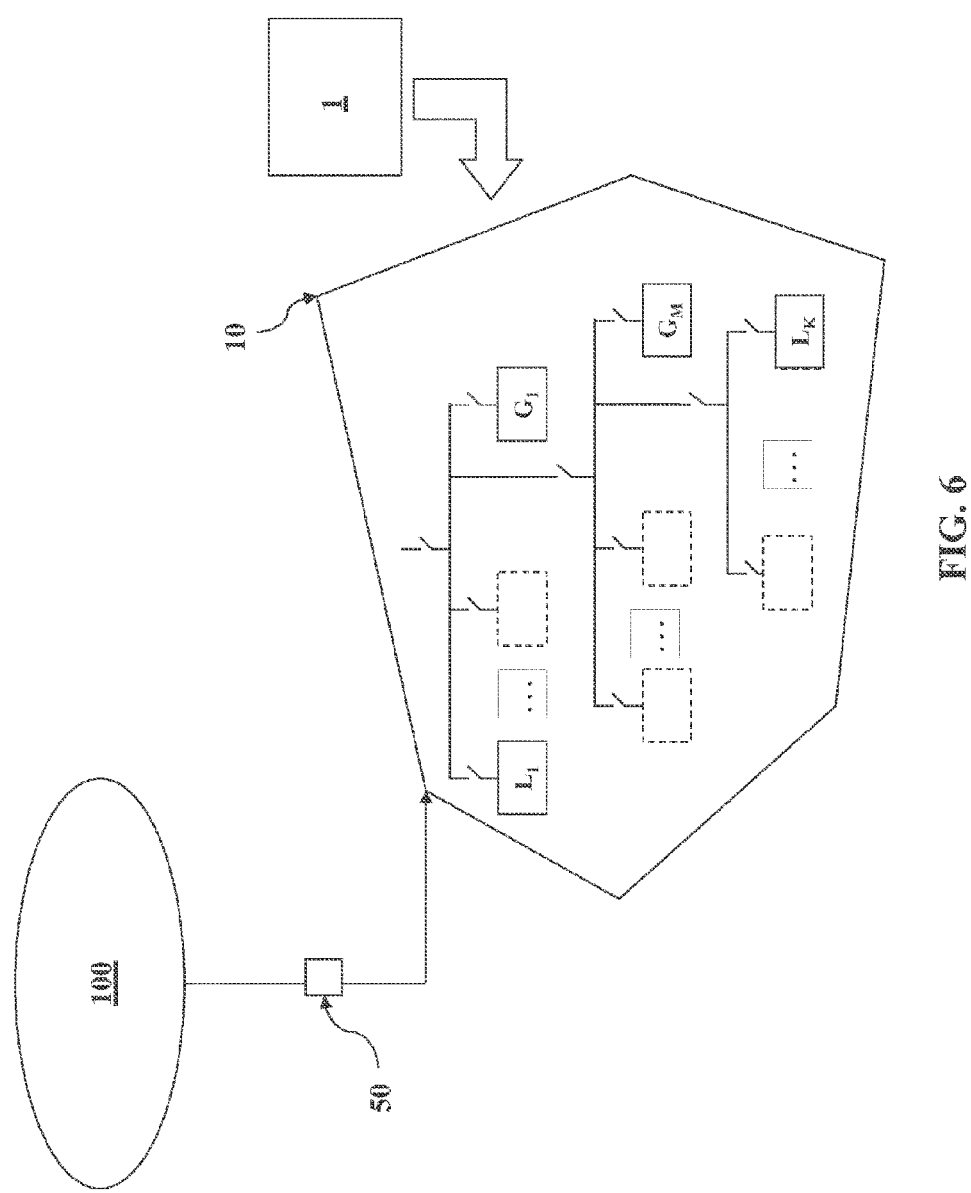

As shown in FIG. 6, the electric generators $G_1, \ldots, G_M$ may be arranged according to multi-level configurations. Other configurations are possible, according to the needs.

The method, according to the invention, foresees to control the load profile of the electric network 10 over time windows $W_T$ of predefined duration.

The method, according to the invention, thus comprises the step of measuring a time window $W_T$ from a reference instant $t_S$.

The time window $W_T$ may advantageously correspond to the energy billing period (e.g. 15 minutes) that is adopted by the electric energy provider.

Of course, time windows $W_T$ of different duration may be employed, according to the needs.

The reference instant $t_s$, at which the time window $W_T$ starts to be measured, is selected.

Preferably, the reference instant $t_S$ for a certain time window $W_T$ is selected so as to coincide with the end instant $t_E$ of the immediately precedent time window.

Preferably, the method, according to the invention, comprises the step of synchronizing the reference instants $t_S$ with a reference signal that is received from the electric power source 100 on a periodic basis, for example once a day.

According to the present invention, the method, according to the invention, comprises a step of determining at least a check instant $t_C$, which is comprised in the time window $W_T$.

Preferably, it is determined a succession of check instants $t_C$ comprised in the time window $W_T$.

At each check instant $t_C$, the method, according to the invention, comprises the step of executing a load profile control procedure 90 for managing the load profile of the electric network 10.

The control procedure 90 comprises a series of steps aimed at tuning, depending on the energy consumption detected or predicted at the check instant $t_C$, the configuration of the electric network 10, in such a way the overall energy consumption of the electric network 10 during the time window $W_T$ follows a certain profile that allows to achieve a predefined energy consumption target established for said time window.

Two subsequent check instants $t_C$ may be separated by a period of few seconds (e.g. 30 seconds) during which the mentioned control procedure 90 is executed.

Longer or shorter intervals may be employed, according to the needs.

The control procedure 90 is now described in details (FIGS. 7-10).

The control procedure 90 comprises the step of acquiring first information $I_1$ that relates to the operating status of the electric network 10, at the check instant $t_C$.

The first information $I_1$ comprises at least a first data set $D_1$ comprising data indicative of a rank assigned to each of the electric loads of the electric network 10, at the check instant $t_C$.

Preferably, the first data set $D_1$ is automatically acquired from a priority table, stored in a memory location.

In said priority table, each electric load is listed according to its rank, which is an index indicative of the order to be followed in disconnecting the loads of the electric network 10 from the electric power source 100.

As an example, a load having a rank R=1 is commanded to be disconnected before a load having a rank R=2, and so on. The actual order of disconnection may depend in addition on load availability (further details are described below).

The same index (rank) may be indicative of the order to be followed in re-connecting the loads of the electric network 10, which were previously disconnected from the electric power source 100.

Of course, the actual order of re-connection of the loads may depend on their availability for re-connection (further details are described below).

The re-connection of said electric loads with the electric power source 100 occurs in a reverse order with respect to the order of disconnection.

Thus, as an example, a load having a rank R=2 is commanded to be re-connected with the electric power source 100 before a load having a rank R=1, and so on.

The mentioned priority table may be of the static type or it may be dynamically updated on a periodic basis, for example once a day or at the starting of each time window $W_T$.

In this last case, the rank R of each electric load may change from one check instant $t_C$ to another, during the time window $W_T$.

This last solution advantageously allows to take into account possible variations of the operating conditions of the electric network 10.

The update of the priority table may be operated on the basis of updating data received, for example, from a man machine interface or a remote device.

The first information $I_1$ comprises also a second data set $D_2$ comprising data indicative of a disconnection level $L_D$ that is assigned to the electrical network 10, at the check instant $t_C$.

The disconnection level $L_D$ of the electrical network 10 indicates the value of rank R, up to which the loads of the electrical network 10 are currently commanded to be disconnected from the power source 100.

As an example, a disconnection level $L_D=3$ of the electric network 10 indicates that all the (available) loads having a rank $R<=3$ are currently commanded to be disconnected from the power source 100.

Advantageously, the control procedure 90 foresees to update the disconnecting level $L_D$ of the electric network 10, depending on the detected or predicted energy consumption of this latter. Thus, the disconnection level $L_D$ of the electric network 10 may change from one check instant $t_C$ to another, during the time window $W_T$.

The first information $I_1$ further comprises a third data set $D_3$ comprising data indicative of a maximum and minimum levels of absorbed energy $E_{MAX}$, $E_{MIN}$ foreseen for the electric network 10 at the check instant $t_C$.

Figure 7:
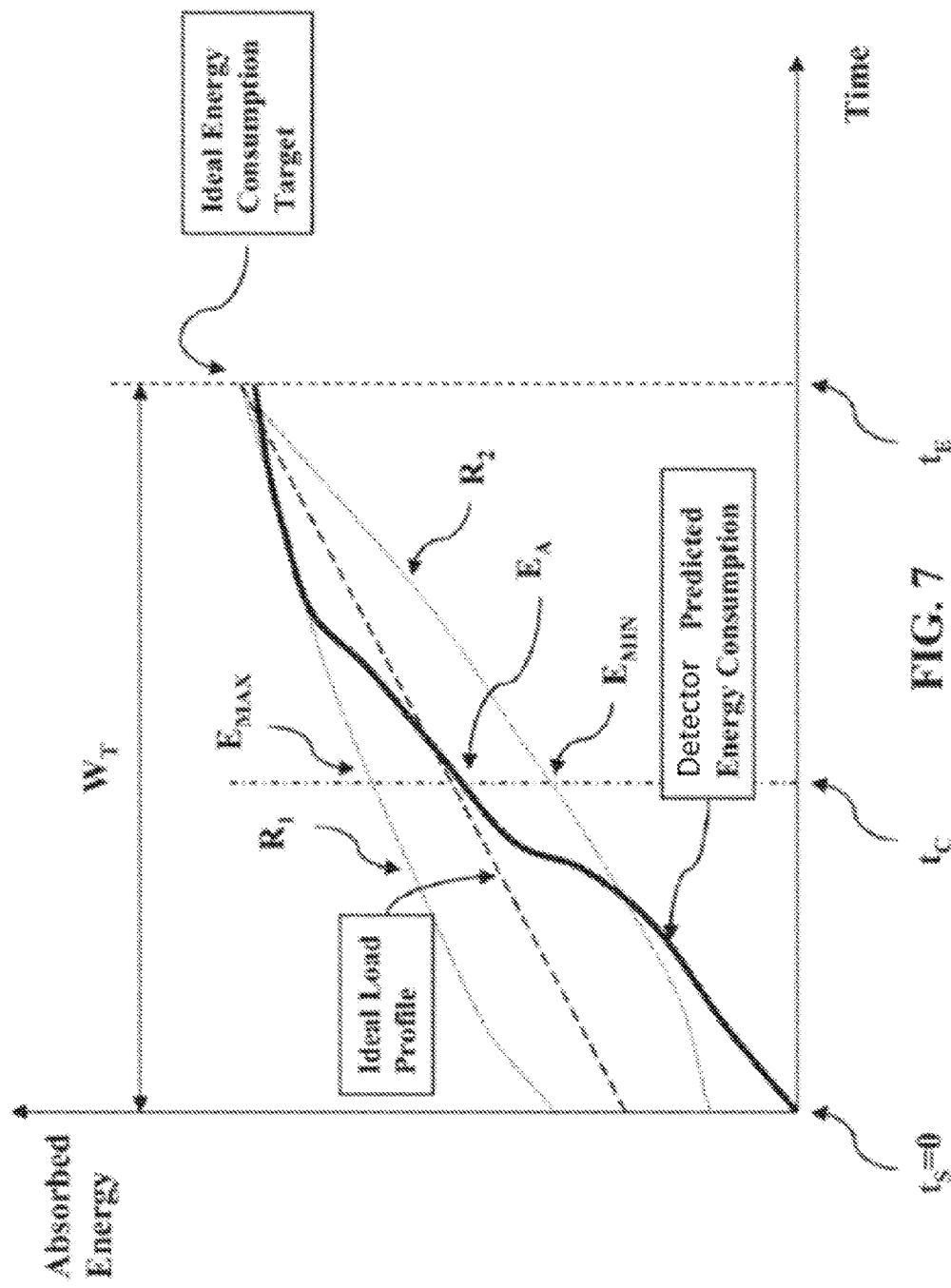

The values $E_{MAX}$, $E_{MIN}$ represent the threshold levels that are foreseen for the energy absorbed by the electric network 10 up to the check instant $t_C$ in order to maintain the energy consumption of the electric network 10 within a range that allows to follow an ideal load profile calculated for achieving an ideal consumption target during the time window $W_T$ (FIG. 7).

As is apparent from FIG. 7, the absorbed energy levels $E_{MAX}$, $E_{MIN}$ typically vary from one check instant $t_C$ to another, during each time window $W_T$.

Such variations can be expressed as curves or functions (see curves R1, R2 of FIGS. 7-9) of the elapsed time and other parameters (e.g., polynomial functions or other type of mathematical functions). These functions can use coefficients that can depend on other parameters such as temperature, time/day, cost of energy etc.

Advantageously, the mentioned data set $D_3$ may be automatically acquired from a memory location, where a succession of predefined absorbed energy levels $E_{MAX}$, $E_{MIN}$ may have been stored in relation to corresponding check instants $t_C$ of the time window $W_T$. Otherwise, the mentioned data set $D_3$ can be calculated based on time, parameters and predefined equations.

Other embodiments of the present invention may foresee that the third data set $D_3$ is acquired from a man machine interface or a remote device.

Preferably, the first information $I_1$ comprises a fifth data set $D_5$ comprising data indicative of the availability of the loads of the electric network 10 to be disconnected/connected from/with the electric power source 100, at the check instant $t_C$.

The fifth data set $D_5$ comprises logical values assigned to the loads of the electric network 10. Each logical value indicates whether the corresponding electric load is available to be disconnected/connected from/with the electric power source 100.

A load of the electric network 10 may be considered as "not available" because a minimum time from the last disconnection/connection from/with the electric power source 100 has not yet passed, or because it is in an inactive state, or because it is subject to malfunctioning, or because it is a load, on which it is not possible to intervene.

The fifth data set $D_5$ is advantageously stored on a memory location and automatically acquired.

Preferably, control procedure 90 comprises a step of updating said fifth data set $D_5$, if one or more electric loads are commanded to be disconnected/connected from/with said electric power source 100.

For example, as soon as the load profile control procedure 90 commands to disconnect/connect an electric load, such an electric load is marked as "not available" for further interventions. On the other hand, if a certain time is passed from the instant, at which it has been operated, the same electric load is marked as "available" for further interventions. The fifth data set $D_5$ may be updated also in case one or more loads of the electric network 10 are operated for other reasons, for example following a protection trip.

The fifth data set $D_5$ may be automatically updated or be updated by a user by means of a man machine interface.

If one or more electric generators are comprised in the electric network 10 the first information $I_1$ preferably comprises a sixth data set $D_6$ comprising data indicative of the rank R assigned to each of said electric generators at the check instant $t_C$.

The mentioned stored priority table may thus comprise also the electric generators of the electric network 10, which are listed according to the assigned rank.

In this case, the order to be followed in commanding the connection of each electric generator is the opposite with respect to the one followed for the disconnection of electric loads of the electric network 10.

As an example, an electric generator having a rank $R=1$ is commanded to be connected after a generator having a rank $R=2$, and so on. The actual order of connection may depend in their availability to be connected (further details are described below).

Again, the same index may be indicative of the order to be followed in commanding the disconnection of the electric generators, which were previously connected to the electric power source 100.

Of course, the disconnection of the electric generators is commanded in a reverse order with respect to their connection. The actual order of disconnection may depend in their availability to be disconnected (further details are described below).

Thus, as an example, a generator having a rank $R=2$ is commanded to be disconnected after a generator having a rank $R=1$, and so on.

If one or more electric generators are comprised in the electric network 10, the first information $I_1$ preferably comprises also a seventh data set $D_7$ comprising data indicative of the availability of said electric generators to be connected/disconnected from/with the electric power source 100, at the check instant $t_C$.

The seventh data set $D_7$ comprises logical values, each of which is assigned to an electric generator of the electric network 10.

Each logical value indicates whether the corresponding electric generator is available to be disconnected/connected from/with the electric power source 100, on the basis of its actual operating conditions.

Preferably, the control procedure 90 comprises the step of updating the seventh data set $D_7$, if one or more electric generators are commanded to be disconnected/connected from/with the electric power source 100.

For example, as soon as the disconnection/connection of an electric generator is commanded, such an electric generator is marked as "not available" for further interventions.

On the other hand, if a certain time is passed from the instant, at which it has been operated, the same electric generator is marked as "available" for further interventions.

As for the fifth data set $D_5$, the seventh data set $D_7$ may be updated in case one or more generators of the electric network 10 are operated for other purposes.

Also the seventh data set $D_7$ may be automatically updated or be directly updated by a user by means of a man machine interface.

The control procedure 90 comprises also the step of acquiring second information $I_2$ that respectively relates to the electric energy consumption of the electric network 10, at the check instant $t_C$.

Advantageously, the second information $I_2$ comprises a fourth data set $D_4$ comprising data indicative of the electric energy $E_A$ that has been absorbed by the electric network 10 during the time window $W_T$, up to the check instant $t_C$.

The fourth data set $D_4$ may comprise the data measured by an energy meter 50 operatively associated with the power source 100.

If two or more electric power sources are present, the fourth data set $D_4$ advantageously comprises the data measured and acquired from each of the energy meters operatively associated with said electric power sources.

The fourth data set $D_4$ may be also provided by the main switching device $B_{10}$ of the electric network 10.

In this case, the energy absorption of the electric network 10 may be directly measured by a control/protection unit $T_{10}$ of the switching device $B_{10}$.

According to an alternative embodiment of the present invention, the fourth data set $D_4$ may comprise the data provided by a prediction algorithm that is executed at the check instant $t_C$.

Further embodiments of the present invention may foresee that the data set $D_4$ comprises both calculated data obtained by means of said prediction algorithm and measured data acquired from the energy meter 50 or main switching device $B_{10}$.

In this case, the data obtained by means of said prediction algorithm are advantageously used to integrate the data directly measured on the field.

Figure 10:
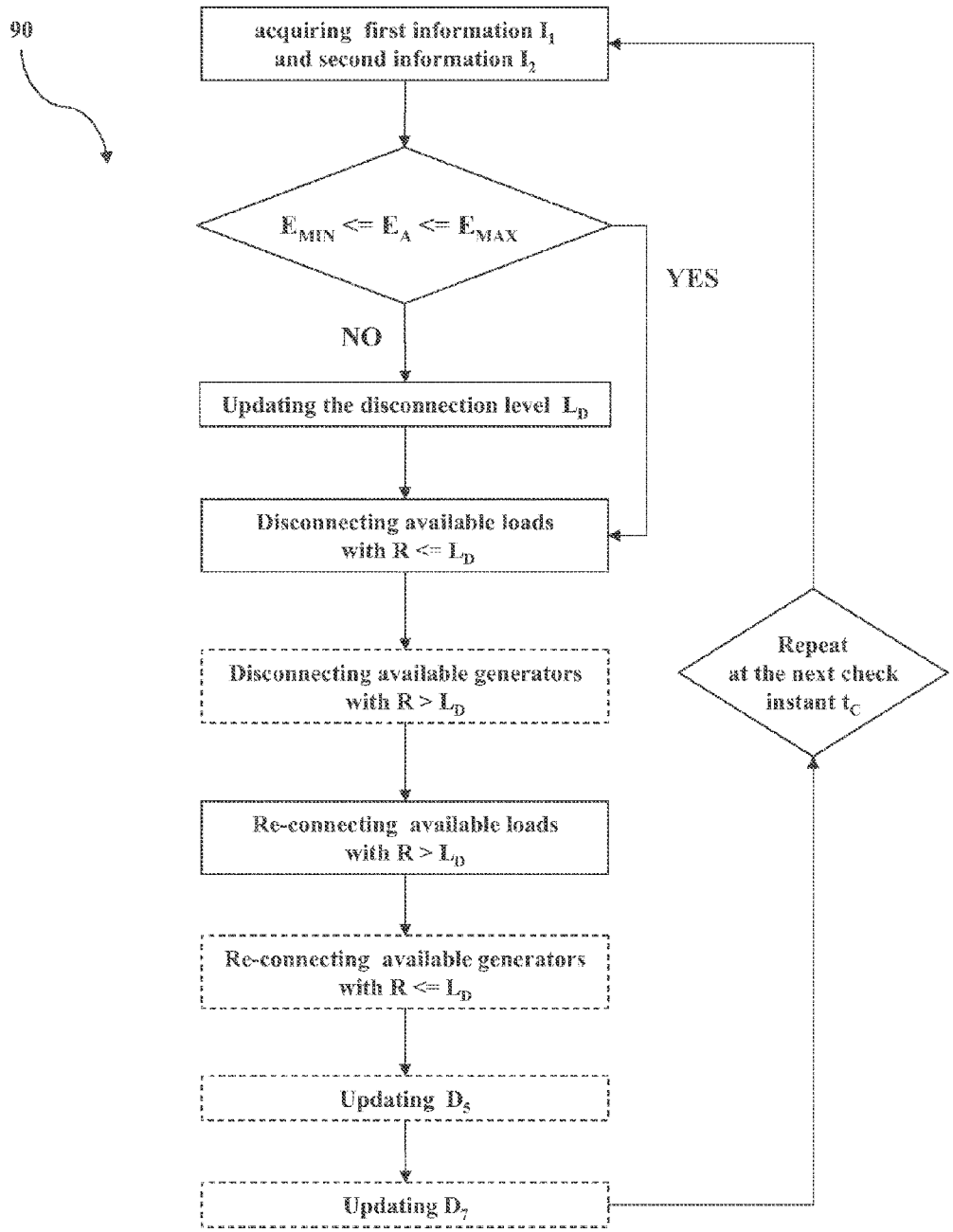

After having executed the steps of uploading the first and second information $I_1$, $I_2$, the control procedure 90 foresees to properly process the data so acquired (FIG. 10).

The control procedure 90 comprises the step of updating the second data set $D_2$, if the energy $E_A$ absorbed by the electric network 10 is not comprised within the maximum and minimum levels of energy $E_{MAX}$, $E_{MIN}$.

Figure 9:
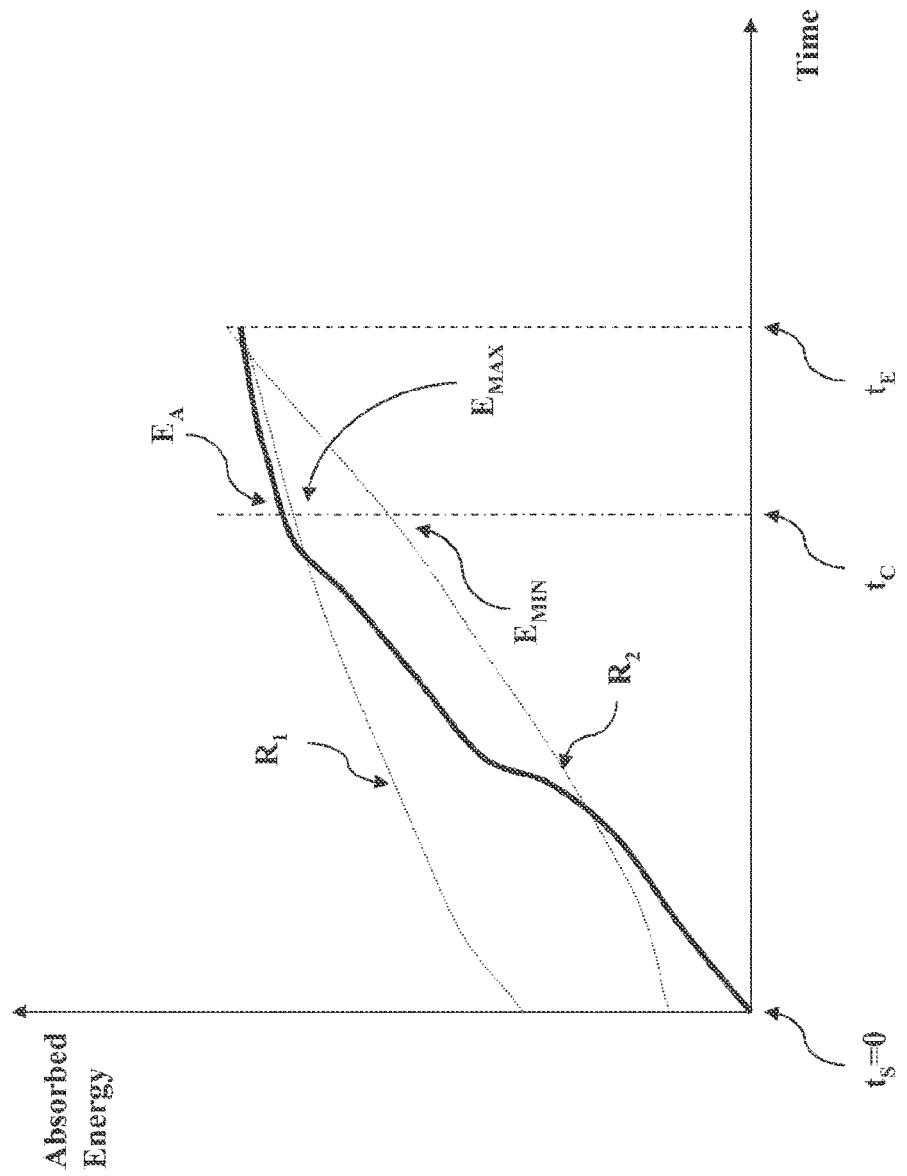

Preferably, the step of updating the second data set $D_2$ comprises the step of increasing the disconnection level $L_D$ that is assigned to the electric network 10, if the energy $E_A$ absorbed by the electric network 10 is higher than the maximum level of energy $E_{MAX}$ (FIG. 9).

Figure 8:
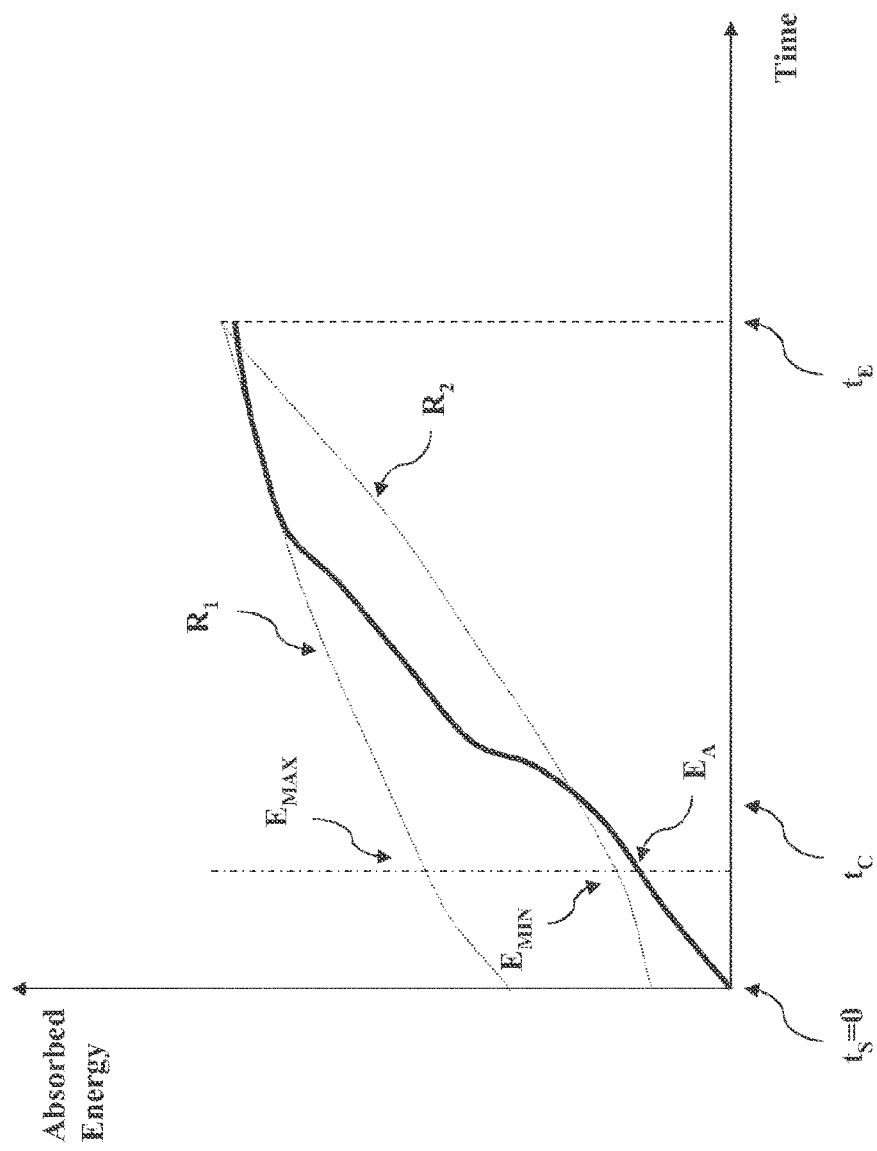

Preferably, the step of updating the second data set $D_2$ comprises also the step of decreasing the disconnection level $L_D$ that is assigned to the electric network 10, if the energy $E_A$ absorbed by the electric network 10 is lower than the minimum level of energy $E_{MIN}$ (FIG. 8).

If the energy $E_A$ absorbed by the electric network 10 is comprised in the foreseen energy range [$E_{MAX}$, $E_{MIN}$], the control procedure does not foresee to update the acquired data set $D_2$, in particular, the disconnection level $L_D$ of the electric network 10 (FIG. 7).

At this point, the control procedure 90 foresees to modify the configuration (and consequently the load profile) of the electric network 10 according to the (updated or unchanged) disconnection level $L_D$ that is currently assigned (FIG. 10).

The control procedure 90 comprises also the step of commanding the connection with the electric power source 100 of the electric loads, which are available for connection and are assigned with a rank R that is higher than the disconnection level $L_D$ that is currently assigned to the electric network 10.

Preferably, the control procedure 90 foresees to manage the disconnection/connection from/with the electric power source 100 of two or more electric loads of the electric network 10, which have a same rank R, on a chronological basis.

If two or more electric loads, which have a same rank R, need to be disconnected from the electric power source 100, the disconnection of said loads is commanded on the basis of the connection time, during which said electric loads have remained connected with the electric power source 100.

In particular, the disconnection of said electric loads is commanded starting from the load having longest connection time up to the load having the shortest connection time.

If two or more electric loads, which have a same rank R, need to be re-connected with the electric power source 100, the connection of said loads is commanded on the basis of the disconnection time, during which said electric loads have remained disconnected from the electric power source 100.

In particular, the connection of said electric loads is commanded starting from the load having longest disconnection time up to the load having the shortest disconnection time.

Preferably, the control procedure 90 comprises the step of connecting the previously disconnected loads of the electric network 10 that have remained disconnected from the power source 100 for a disconnection time that is longer than a maximum threshold value. This intervention is operated independently from the rank R of these electric loads.

Such a solution is quite advantageous, since it prevents the so-called "load starving" phenomenon, i.e. the fact that electric loads remain disconnected for a too long time, or do not receive the average power required to perform their function.

If the electric network 10 comprises one or more electric generators, the control procedure 90 foresees to command the disconnection/connection of these latter according to intervention conditions that are symmetric with respect to those just described above in relation to the loads of the electric network 10.

The control procedure 90 thus preferably comprises the step of commanding the disconnection from the electric power source 100 of the electric generators, which are available for disconnection and are assigned with a rank R that is higher than the disconnection level $L_D$ that is currently assigned to the electric network 10.

The control procedure 90 preferably comprises also the step of commanding the connection with the electric power source 100 of the electric generators, which are available for connection and are assigned with a rank R that is lower or equal than the disconnection level $L_D$ that is currently assigned to the electric network 10.

As for the electric loads, the control procedure 90 preferably foresees to manage the disconnection/connection from/with the electric power source 100 of two or more electric generators of the electric network 10, which have a same rank R, on a chronological basis.

As mentioned above, the steps of the described control procedure 90 are executed at each check instant $t_C$ of time window $W_T$.

The method, according to the invention, thus allows to actively manage the configuration of the electric network 10 during the entire duration of the time window $W_T$.

During each time window $W_T$, it is thus possible to vary the configuration of the electric network 10 so as to achieve the ideal power consumption target established for said time window.

When the time window $W_T$ is elapsed (instant $t_E$), the method, according to the invention, foresees to determine a new reference instant $t_S$ and repeat the described cycle of steps for managing the load profile of the electric network 10 in relation to a new time window $W_T$, which is measured from said new reference instant $t_S$.

Also in this case, the load profile of the electric network 10 is managed with the aim of achieving a new power consumption target established for said new time window.

The method, according to the invention, thus allows to continuously keep under control the load profile of the electric network 10.

In a further aspect, the present invention, relates to a control system 1 for implementing the method, according to the invention.

The control system 1 may be arranged according to various control architectures.

According to an embodiment of the present invention (FIGS. 2-3), the control system 1 is arranged according to a centralized control architecture.

In this case, the control system 1 comprises a master controller 1M, which is provided with computerized means for executing the method, according to the invention.

Within the framework of the present invention the term "computerised means" relates to software programs, modules, routines, and/or instructions that are stored or uploaded and are executed by one or more processing devices, such as, for instance, microcontrollers or other digital processing devices.

Advantageously, the master controller 1M is electrically wired with the switching devices $B_{10}, B_{12}, B_{23}, B_1, \ldots, B_K$ that are operatively associated to the loads $L_{10}, L_{12}, L_{23}, L_1, \ldots, L_K$.

The master controller 1M is configured to send command signals $C_{10}, C_{12}, C_{23}, C_1, \ldots, C_K$ to the actuating means (e.g. actuating coils or motors) of the switching devices $B_{10}, B_{12}, B_{23}, B_1, \ldots, B_K$, so as to command the disconnection/connection of the loads $L_{10}, L_{12}, L_{23}, L_1, \ldots, L_K$ (and/or possible generators) with/from the electric power source 100 (FIG. 2).

The master controller 1M may be a stand alone device, be integrated with the main switching device $B_{10}$ of the electric network 10 or be constituted by the control/protection unit $T_{10}$ of the main switching device $B_{10}$.

As an alternative (FIG. 3), the master controller 1M is arranged so as to be capable of communicating with the control/protection units $T_{10}, T_{12}, T_{23}, T_1, \ldots, T_K$ of the switching devices $B_{10}, B_{12}, B_{23}, B_1, \ldots, B_K$ by means of a communication bus.

In this case, the command signals $C_{10}, C_{12}, C_{23}, C_1, \ldots, C_K$ are sent to the control/protection units $T_{10}, T_{12}, T_{23}, T_1, \ldots, T_K$ of the switching devices $B_{10}, B_{12}, B_{23}, B_1, \ldots, B_K$, which in turn activate the actuating means of said switching devices $B_{10}, B_{12}, B_{23}, B_1, \ldots, B_K$, so as to disconnect/connect the loads $L_{10}, L_{12}, L_{23}, L_1, \ldots, L_K$ (and/or possible generators) with/from the electric power source 100.

According to other embodiments of the present invention (FIGS. 4-5), the control system 1 comprises a main controller $M_A$ and one or more secondary controllers $M_B$, $M_C$.

Each of the controllers $M_A$, $M_B$, $M_C$ is configured to command the disconnection/connection from/with the electric power source 100 of a predefined group of loads (and/or possible generators) of the electric network 10.

As an example, the controllers $M_B$, $M_C$ may be respectfully configured to control the electric loads (and/or possible generators) of the branches 10A, 10B of the electric network 10 while the controller $M_A$ may be configured to control one or more loads (and/or possible generators) of the root level of the electric network 10.

Each of the controllers $M_A$, $M_B$, $M_C$ may be a stand alone device, be integrated with a switching device of the electric network 10 or be formed by the control/protection unit of a switching device of the electric network 10.

The controllers $M_A$, $M_B$, $M_C$ may be wired with the switching devices operatively associated with the loads (and/or possible generators) under their direct control or be capable of communicating via a communication bus with the control/protection units of the switching devices operatively associated with the loads (and/or possible generators) under their direct control.

Preferably, the controllers $M_A$, $M_B$, $M_C$ are capable of mutually communicating by means a communication bus.

According to an embodiment of the present invention (FIG. 4), the control system 1 is arranged according to a multi-level control architecture.

In this case, only the main controller $M_A$ is provided with computerised means to execute the steps of the method, according to the invention.

The main controller $M_A$ is configured to generate command signals to command the disconnection/connection from/with the electric power source 100 of the loads (and/or possible generators) under its direct control.

In order to command the disconnection/connection of the electric loads (and/or possible generators) under the control of the controllers $M_B$, $M_C$, the main controller $M_A$ provides the controllers $M_B$, $M_C$ with a signal $S_1$ that is indicative of the disconnection level $L_D$ assigned to the electric network 10.

On the base of the signals $S_1$, the controllers $M_B$, $M_C$ generate command signals to command the disconnection/connection of the electric loads (and/or possible generators) that are under their direct control.

According to another embodiment of the present invention (FIG. 5), the control system 1 is arranged according to a distributed control architecture.

In this case, each of controllers $M_A$, $M_B$, $M_C$, is provided with computerised means to execute the steps of the method, according to the invention.

Each of the controllers $M_A$, $M_B$, $M_C$ is configured to generate command signals to command the disconnection/connection from/with the electric power source 100 of the loads (and/or possible generators) under its direct control.

In order to allow the controllers $M_B$, $M_C$ to independently execute the steps of the method, according to the invention, the main controller $M_A$ provides the controllers $M_B$, $M_C$ with signals $S_2$, which are indicative of the first and second information $I_1$, $I_2$ to be acquired at each check instant $t_C$ in relation to the portion of the electric network 10 under their direct control.

Preferably, the secondary controllers $M_B$, $M_C$ are synchronized with the main controller $M_A$. Advantageously, the main controller $M_A$ provides the controllers $M_B$, $M_C$ also with synchronization signals $S_3$.

Possible embodiments of the present invention may foresee that each of the secondary controllers $M_B$, $M_C$ follows its own timing while measuring the time window $W_T$ and determining the check instants $t_C$.

The control system 1 may be implemented according to control architectures that are different from those described above. Such possible variants are considered within the capacity of the skilled person.

The method and the control system, according to the present invention, have proven to be actually effective in managing the load profile of an electric network.

The method and the control system, according to the present invention, are quite effective in reducing the probability of power demand peaks.

The method and the control system, according to the invention, allow to control the load profile of an electric network taking into account the actual operating conditions of the electric network itself, in particular of its electric loads (and/or generators).

The load profile of an electric network may be controlled according to load curves that may be easily tuned or programmed to take into account the current functioning time (e.g. the time of day) of the electric network, the energy costs, the availability of less expensive power sources, and the like.

The method and the control system, according to the invention, therefore offer more flexibility to power transients with respect to methods that employ instantaneous power or current as a basis for disconnection.

The control system, according to the invention, may adopt various control architectures, for example centralised, multi-level or distributed control architectures.

Advantageously, the control system, according to the invention, may be practically implemented using the hardware/software resources that are already present in the electric network, Thus, the control system, according to the invention, preferably comprises one or more control/protection units operatively, which are associated to one or more switching devices of the electric network or which are mounted on board said switching devices.

The control system, according to the invention, may adopt communication systems of common use, in particular master-slave or peer-to-peer communication buses arranged between the control/protection units of the switching devices of the electric network, e.g., communication protocols such as MODBUS or protocols according to IEC61850.

The method and control system, according to the invention, are thus particularly adapted for being employed in digitally enabled power distribution networks (smart grids).

The method and the control system, according to the invention, are of relatively easy and cost-effective realization at industrial level and practical implementation on the field.

The invention claimed is:

1. A method for managing the load profile of a low or medium voltage electric network, said electric network being supplied by at least an electric power source-and comprising one or more electric loads ($L_{10}$, $L_{12}$, $L_{23}$, $L_1$, ..., $L_K$), which can be disconnected/connected from/with said electric power source, and one or more controllable switching devices ($B_{10}$, $B_{12}$, $B_{23}$, $B_1$, ..., $B_K$) for disconnecting/connecting said electric loads from/with said electric power source, which comprises the steps of:
- measuring a time window ($W_T$) from a reference instant ($t_s$);
- determining at least a check instant ($t_C$) comprised in said time window ($W_T$); and
- executing a load profile control procedure at said check instant, said control procedure comprising the steps of:
  - acquiring first information ($I_1$) related to the operating status of said electric network, said first information comprising a first data set ($D_1$) comprising data indicative of a rank (R) assigned to each of said electric loads at said check instant ($t_C$), a second data set ($D_2$) comprising data indicative of a disconnection level ($L_D$) assigned to said electrical network at said check instant ($t_C$), a third data set ($D_3$) comprising data indicative of a maximum and minimum level of absorbed energy ($E_{MAX}$, $E_{MIN}$) foreseen for said electric network at said check instant ($t_C$);
  - acquiring second information ($I_2$) related to the electric energy consumption of said electric network, said second information comprising a fourth data set ($D_4$) comprising data indicative of the energy ($E_A$) that has been absorbed by said electric network up to said check instant ($t_C$);
  - updating said second data set ($D_2$), if the energy absorbed by said electric network is not comprised within said maximum and minimum levels of energy,
  - commanding the disconnection from said electric power source of the electric loads, which are available for disconnection and are assigned with a rank (R) that is lower or equal than the disconnection level that is assigned to said electric network; and
  - commanding the connection with said electric power source of the previously disconnected electric loads, which are available for connection and are assigned with a rank (R) that is higher than the disconnection level that is assigned to said electric network;
  - wherein said step of updating said second data set ($D_2$) comprises:
    - increasing the disconnection level ($L_D$) that is assigned said electric network, if the energy absorbed by said electric network is higher than said maximum level of energy $E_{MAX}$);
    - decreasing the disconnection level ($L_D$) that is assigned said electric network, if the energy absorbed by said electric network is lower than said minimum level of energy ($E_{MIN}$).

2. The method, according to claim 1, wherein said first information ($I_1$) comprises a fifth data set ($D_5$) comprising data indicative of the availability of said electric loads to be disconnected/connected from/with said electric power source at said check instant ($t_C$).

3. The method, according to claim 2, wherein said control procedure comprises the step of updating said fifth data set ($D_5$) if one or more electric loads are commanded to be disconnected/connected from/with said electric power source.

4. The method, according to claim 3, wherein said electric network comprises one or more electric generators ($G_1$, ..., $G_M$), which can be disconnected/connected from/with said electric power source, said first information comprising a sixth data set ($D_6$) comprising data indicative of a rank (R) assigned to each of said electric generators at said check instant ($t_C$), said control procedure comprising the steps of:

commanding the disconnection from said electric power source of the electric generators, which are available for disconnection and are assigned with a rank (R) that is higher than the disconnection level that is assigned to said electric network; and commanding the connection with said electric power source of the previously disconnected electric generators, which are available for connection and are assigned with a rank (R) that is equal or lower than the disconnection level that is assigned to said electric network.

5. The method, according to claim 2, wherein said electric network comprises one or more electric generators ($G_1, \ldots, G_M$), which can be disconnected/connected from/with said electric power source, said first information comprising a sixth data set ($D_6$) comprising data indicative of a rank (R) assigned to each of said electric generators at said check instant ($t_C$), said control procedure comprising the steps of:

commanding the disconnection from said electric power source of the electric generators, which are available for disconnection and are assigned with a rank (R) that is higher than the disconnection level that is assigned to said electric network; and commanding the connection with said electric power source of the previously disconnected electric generators, which are available for connection and are assigned with a rank (R) that is equal or lower than the disconnection level that is assigned to said electric network.

6. The method, according to claim 1, wherein said control procedure comprises the step of commanding the connection with said electric power source of the previously disconnected electric loads, which have remained disconnected from said electric power source for a predetermined period of time.

7. The method, according to claim 1, wherein the disconnection from said electric power source of electric loads, which have a same rank (R), is commanded depending on the connection time, during which said electric loads have remained connected with said electric power source.

8. The method, according to claim 1, wherein said second information ($I_2$) is acquired from an energy meter that is operatively associated with said electric power source.

9. A control system for implementing the method, according to claim 1.

10. The control system, according to claim 9, further comprising one or more control/protection units ($T_{10}, T_{12}, T_{23}, T_1, \ldots, T_K$), which are operatively associated to or mounted on board one or more switching devices of the electric network.

11. An electric network comprising the control system, according to claim 9.

12. The method, according to claim 1, wherein said first information ($I_1$) comprises a fifth data set ($D_5$) comprising data indicative of the availability of said electric loads to be disconnected/connected from/with said electric power source at said check instant ($t_C$).

13. The method, according to claim 12, wherein said control procedure comprises the step of updating said fifth data set ($D_5$) if one or more electric loads are commanded to be disconnected/connected from/with said electric power source.

14. The method, according to claim 1, wherein said electric network comprises one or more electric generators ($G_1, \ldots, G_M$), which can be disconnected/connected from/with said electric power source, said first information comprising a sixth data set ($D_6$) comprising data indicative of a rank (R) assigned to each of said electric generators at said check instant ($t_C$), said control procedure comprising the steps of:

commanding the disconnection from said electric power source of the electric generators, which are available for disconnection and are assigned with a rank (R) that is higher than the disconnection level that is assigned to said electric network; and commanding the connection with said electric power source of the previously disconnected electric generators, which are available for connection and are assigned with a rank (R) that is equal or lower than the disconnection level that is assigned to said electric network.

15. The method, according to claim 1, wherein said control procedure comprises the step of commanding the connection with said electric power source of the previously disconnected electric loads, which have remained disconnected from said electric power source for a predetermined period of time.

16. A method for managing the load profile of a low or medium voltage electric network, said electric network being supplied by at least an electric power source and comprising one or more electric loads ($L_{10}, L_{12}, L_{23}, L_1, \ldots, L_K$), which can be disconnected/connected from/with said electric power source, and one or more controllable switching devices ($B_{10}, B_{12}, B_{23}, B_1, \ldots, B_K$) for disconnecting/connecting said electric loads from/with said electric power source, which comprises the steps of:

measuring a time window ($W_T$) from a reference instant ($t_S$);

determining at least a check instant ($t_C$) comprised in said time window ($W_T$); and executing a load profile control procedure at said check instant, said control procedure comprising the steps of:

acquiring first information ($I_1$) related to the operating status of said electric network, said first information comprising a first data set ($D_1$) comprising data indicative of a rank (R) assigned to each of said electric loads at said check instant ($t_C$), a second data set ($D_2$) comprising data indicative of a disconnection level ($L_D$) assigned to said electrical network at said check instant ($t_C$), a third data set ($D_3$) comprising data indicative of a maximum and minimum level of absorbed energy ($E_{MAX}, E_{MIN}$) foreseen for said electric network at said check instant ($t_C$);

acquiring second information ($I_2$) related to the electric energy consumption of said electric network, said second information comprising a fourth data set ($D_4$) comprising data indicative of the energy ($E_A$) that has been absorbed by said electric network up to said check instant ($t_C$)

updating said second data set ($D_2$), if the energy absorbed by said electric network is not comprised within said maximum and minimum levels of energy, commanding the disconnection from said electric power source of the electric loads, which are available for disconnection and are assigned with a rank (R) that is lower or equal than the disconnection level that is assigned to said electric network; and commanding the connection with said electric power source of the previously disconnected electric loads, which are available for connection and are assigned with a rank (R) that is higher than the disconnection level that is assigned to said electric network;

wherein said electric network comprises one or more electric generators ($G_1, \ldots, G_M$), which can be disconnected/connected from/with said electric power source, said first information comprising a sixth data set ($D_6$) comprising data indicative of a rank (R) assigned to each of said electric generators at said check instant ($t_C$), said control procedure comprising the steps of:

commanding the disconnection from said electric power source of the electric generators, which are available for disconnection and are assigned with a rank (R) that is higher than the disconnection level that is assigned to said electric network; and commanding the connection with said electric power source of the previously disconnected electric generators, which are available for connection and are assigned with a rank (R) that is equal or lower than the disconnection level that is assigned to said electric network.

17. The method, according to claim 16, wherein said first information ($I_1$) comprises a seventh data set ($D_7$) comprising data indicative of the availability of said electric generators to be disconnected/connected from/with said electric power source at said check instant ($t_C$).

18. The method, according to claim 17, wherein said control procedure comprises the step of updating said seventh data set ($D_7$), if one or more electric generators are disconnected/connected from/with said electric power source.

19. A method, for managing the load profile of a low or medium voltage electric network, said electric network being supplied by at least an electric power source and comprising one or more electric loads (L10, L12, L23, L1, ..., LK), which can be disconnected/connected from/with said electric power source, and one or more controllable switching devices (B10, B12, B23, B1, ..., BK) for disconnecting/connecting said electric loads from/with said electric power source, which comprises the steps of:

measuring a time window (WT) from a reference instant (tS);

determining at least a check instant (tC) comprised in said time window (WT); and executing a load profile control procedure at said check instant, said control procedure comprising the steps of:

acquiring first information (I1) related to the operating status of said electric network, said first information comprising a first data set (D1) comprising data indicative of a rank (R) assigned to each of said electric loads at said check instant (tC), a second data set (D2) comprising data indicative of a disconnection level (LD) assigned to said electrical network at said check instant (tC), a third data set (D3) comprising data indicative of a maximum and minimum level of absorbed energy (EMAX, EMIN) foreseen for said electric network at said check instant (tC);

acquiring second information (I2) related to the electric energy consumption of said electric network, said second information comprising a fourth data set (D4) comprising data indicative of the energy (EA) that has been absorbed by said electric network up to said check instant (tC);

updating said second data set (D2), if the energy absorbed by said electric network is not comprised within said maximum and minimum levels of energy, commanding the disconnection from said electric power source of the electric loads, which are available for disconnection and are assigned with a rank (R) that is lower or equal than the disconnection level that is assigned to said electric network; and commanding the connection with said electric power source of the previously disconnected electric loads, which are available for connection and are assigned with a rank (R) that is higher than the disconnection level that is assigned to said electric network;

wherein the connection with said electric power source of previously disconnected electric loads, which have a same rank (R), is commanded depending on the disconnection time, during which said electric loads have remained disconnected from said electric power source.

20. A control system for managing the load profile of a low or medium voltage electric network, said electric network being supplied by at least an electric power source and comprising one or more electric loads ($L_{10}, L_{12}, L_{23}, L_1, \ldots, L_K$), which can be disconnected/connected from/with said electric power source, and one or more controllable switching devices ($B_{10}, B_{12}, B_{23}, B_1, \ldots, B_K$) for disconnecting/connecting said electric loads from/with said electric power source, the control system comprising electronic computer hardware in combination with software, comprising:

a processor;

a memory storing the software, the software being programmed to cause the control system to execute steps comprising:

measuring a time window ($W_T$) from a reference instant ($t_S$);

determining at least a check instant ($t_C$) comprised in said time window ($W_T$); and executing a load profile control procedure at said check instant, said control procedure comprising the steps of:

acquiring first information ($I_1$) related to the operating status of said electric network, said first information comprising a first data set ($D_1$) comprising data indicative of a rank (R) assigned to each of said electric loads at said check instant ($t_C$), a second data set ($D_2$) comprising data indicative of a disconnection level ($L_D$) assigned to said electrical network at said check instant ($t_C$), a third data set ($D_3$) comprising data indicative of a maximum and minimum level of absorbed energy ($E_{MAX}, E_{MIN}$) foreseen for said electric network at said check instant ($t_C$);

acquiring second information ($I_2$) related to the electric energy consumption of said electric network, said second information comprising a fourth data set ($D_4$) comprising data indicative of the energy ($E_A$) that has been absorbed by said electric network up to said check instant ($t_C$);

updating said second data set ($D_2$), if the energy absorbed by said electric network is not comprised within said maximum and minimum levels of energy, commanding the disconnection from said electric power source of the electric loads, which are available for disconnection and are assigned with a rank (R) that is lower or equal than the disconnection level that is assigned to said electric network; and commanding the connection with said electric power source of the previously disconnected electric loads, which are available for connection and are assigned with a rank (R) that is higher than the disconnection level that is assigned to said electric network;

wherein said step of updating said second data set ($D_2$) comprises:

increasing the disconnection level ($L_D$) that is assigned said electric network, if the energy absorbed by said electric network is higher than said maximum level of energy ($E_{MAX}$);

decreasing the disconnection level ($L_D$) that is assigned said electric network, if the energy absorbed by said electric network is lower than said minimum level of energy ($E_{MIN}$).

21. Computer program code stored on a non-transitory computer readable medium for instructing a control system to manage the load profile of a low or medium voltage electric network, said electric network being supplied by at least an electric power source and comprising one or more electric loads ($L_{10}$, $L_{12}$, $L_{23}$, $L_1$, ..., $L_K$), which can be disconnected/connected from/with said electric power source, and one or more controllable switching devices ($B_{10}$, $B_{12}$, $B_{23}$, $B_1$, ..., $B_K$) for disconnecting/connecting said electric loads from/with said electric power source, the code comprising:

code for measuring a time window ($W_T$) from a reference instant ($t_S$);

code for determining at least a check instant ($t_C$) comprised in said time window ($W_T$); and code for executing a load profile control procedure code at said check instant, said control procedure code comprising:

code for acquiring first information ($I_1$) related to the operating status of said electric network, said first information comprising a first data set ($D_1$) comprising data indicative of a rank (R) assigned to each of said electric loads at said check instant ($t_C$), a second data set ($D_2$) comprising data indicative of a disconnection level ($L_D$) assigned to said electrical network at said check instant ($t_C$), a third data set ($D_3$) comprising data indicative of a maximum and minimum level of absorbed energy ($E_{mAx}$, $E_{MIN}$) foreseen for said electric network at said check instant ($t_C$);

code for acquiring second information ($I_2$) related to the electric energy consumption of said electric network, said second information comprising a fourth data set ($D_4$) comprising data indicative of the energy ($E_A$) that has been absorbed by said electric network up to said check instant ($t_C$);

code for updating said second data set ($D_2$), if the energy absorbed by said electric network is not comprised within said maximum and minimum levels of energy, code for commanding the disconnection from said electric power source of the electric loads, which are available for disconnection and are assigned with a rank (R) that is lower or equal than the disconnection level that is assigned to said electric network; and code for commanding the connection with said electric power source of the previously disconnected electric loads, which are available for connection and are assigned with a rank (R) that is higher than the disconnection level that is assigned to said electric network;

wherein said code for updating said second data set ($D_2$) comprises:

code for increasing the disconnection level ($L_D$) that is assigned said electric network, if the energy absorbed by said electric network is higher than said maximum level of energy ($E_{MAX}$);

code for decreasing the disconnection level ($L_D$) that is assigned said electric network, if the energy absorbed by said electric network is lower than said minimum level of energy ($E_{MIN}$).

* * * * *